(12) United States Patent
Corbo et al.

(10) Patent No.: US 8,812,386 B2
(45) Date of Patent: Aug. 19, 2014

(54) RETAIL PLANNING APPLICATION AND METHOD FOR CONSUMER PRODUCTS

(71) Applicant: American Greetings Corporation, Cleveland, OH (US)

(72) Inventors: Jason Corbo, Avon Lake, OH (US); Matt Baker, North Olmsted, OH (US); Kyle Roggenburk, Cleveland, OH (US)

(73) Assignee: American Greetings Corporation, Cleveland, OH (US)

( * ) Notice: Subject to any disclaimer, the term of this patent is extended or adjusted under 35 U.S.C. 154(b) by 0 days.

(21) Appl. No.: 13/779,893

(22) Filed: Feb. 28, 2013

(65) Prior Publication Data

US 2013/0218635 A1    Aug. 22, 2013

Related U.S. Application Data

(62) Division of application No. 13/153,963, filed on Jun. 6, 2011, now Pat. No. 8,589,270.

(60) Provisional application No. 61/351,443, filed on Jun. 4, 2010, provisional application No. 61/363,311, filed on Jul. 12, 2010.

(51) Int. Cl.
    *G06Q 40/00* (2012.01)

(52) U.S. Cl.
    USPC .............................................. 705/35; 705/40

(58) Field of Classification Search
    CPC ....... G06Q 10/00; G06Q 20/00; G06Q 30/00; G06Q 40/00
    USPC ....................................................... 705/3–44
    See application file for complete search history.

(56) References Cited

U.S. PATENT DOCUMENTS

| 7,379,890 | B2 * | 5/2008 | Myr et al. | 705/7.35 |
|---|---|---|---|---|
| 7,644,009 | B2 * | 1/2010 | Amerasinghe et al. | 705/7.31 |
| 7,689,456 | B2 * | 3/2010 | Schroeder et al. | 705/7.31 |
| 7,848,967 | B2 * | 12/2010 | Young | 705/28 |
| 8,010,404 | B1 * | 8/2011 | Wu et al. | 705/7.29 |
| 8,108,249 | B2 * | 1/2012 | Schroeder et al. | 705/7.37 |
| 2005/0096963 | A1 * | 5/2005 | Myr et al. | 705/10 |
| 2005/0283404 | A1 * | 12/2005 | Young | 705/22 |
| 2006/0015416 | A1 * | 1/2006 | Hoffman et al. | 705/28 |
| 2007/0260524 | A1 * | 11/2007 | Young | 705/22 |
| 2008/0133313 | A1 * | 6/2008 | Bateni et al. | 705/10 |
| 2008/0288889 | A1 * | 11/2008 | Hunt et al. | 715/810 |
| 2008/0294996 | A1 * | 11/2008 | Hunt et al. | 715/739 |
| 2009/0006156 | A1 * | 1/2009 | Hunt et al. | 705/7 |
| 2009/0018996 | A1 * | 1/2009 | Hunt et al. | 707/2 |
| 2009/0099879 | A1 * | 4/2009 | Ouimet | 705/7 |
| 2009/0234710 | A1 * | 9/2009 | Belgaied Hassine et al. | 705/10 |
| 2009/0248488 | A1 * | 10/2009 | Shah et al. | 705/10 |
| 2011/0071928 | A1 * | 3/2011 | Young | 705/28 |
| 2011/0196717 | A1 * | 8/2011 | Colliat et al. | 705/7.29 |
| 2012/0095804 | A1 * | 4/2012 | Calabrese et al. | 705/7.31 |

* cited by examiner

*Primary Examiner* — Frantzy Poinvil
(74) *Attorney, Agent, or Firm* — Christine Flanagan

(57) ABSTRACT

An improved forecasting and modeling tool for planning and estimating sales of consumer products, including social expression products in a retail operation. The tool enables retailers to create a plan based on information shared between the retailer and vendor of social expression products. The methodology employed begins with actual sales totals for the prior term and the plan goal for the current term and provides financial calculations based on a variety of factors to determine the sales bridge needed to meet the current term goal. Information relating to actual sales, significant events, door activity, current forecast, trending data, and vendor initiatives are input into the application and are used in financial calculations to determine a current term sales plan.

7 Claims, 11 Drawing Sheets

Plan Product Summary

| | FY09 Actuals | FY10 Plan | Var. | FY10 Plan | FY10 Est. | Var. |
|---|---|---|---|---|---|---|
| Everyday Cards | $21,151,490 | $21,648,811 | 2.4% | $21,648,811 | | |
| Seasonal Cards | $10,249,469 | $10,448,326 | 1.9% | $10,448,326 | | |
| Total Cards | $31,400,960 | $32,097,137 | 2.2% | $32,097,137 | | |
| Evdy Giftwrap | $7,763,831 | $7,751,776 | -0.2% | $7,751,776 | | |
| Evdy Party Goods | $2,729,736 | $2,755,298 | 0.9% | $2,755,298 | | |
| Evdy Cello / Stat | $1,083,232 | $1,214,266 | 12.1% | $1,214,266 | | |
| Evdy Stickers | $308,095 | $374,944 | 21.7% | $374,944 | | |
| Seasonal - Non Card | $3,523,088 | $3,551,700 | 0.8% | $3,551,700 | | |
| Total Creative Products | $15,407,981 | $15,647,983 | 1.6% | $15,647,983 | | |
| Stretch Goal | | | | | | |
| Total Sales | $46,808,941 | $47,745,120 | 2.0% | $47,745,120 | | |

Navigation: Report Out | Dashboard | Door Activity | Event Log | Trend | Plan Year Non-Card | Initiatives | Plan Year Summary | Plan by Week

Summary

Open/Closed Impact — 54

|  | Activity Yr $ Impact | Following Yr $ Impact | 12 Month Impact |
| --- | --- | --- | --- |
| FY08 | $350,521 | $237,776 | $588,297 |
| FY09 | ($143,599) | $143,599 | $0 |
| FY10 | $0 | $0 | $0 |

Recolation/Remodel Impact — 56

|  | Activity Yr $ Impact | Following Yr $ Impact | 12 Month Impact |
| --- | --- | --- | --- |
| FY08 |  |  |  |
| FY09 | $0 | $0 | $0 |
| FY10 | $0 | $0 | $0 |

Total Impact — 58

|  | Activity Yr $ Impact | Following Yr $ Impact | 12 Month Impact |
| --- | --- | --- | --- |
| FY08 | $350,521 | $237,776 | $588,297 |
| FY09 | ($143,599) | $143,599 | $0 |
| FY10 | $0 | $0 | $0 |

Door Count Summary — 60

|  | Start | End | Net Change |
| --- | --- | --- | --- |
| FY08 | 127 | 129 | 2 |
| FY09 | 129 | 129 | 0 |
| FY10 | 129 | 129 | 0 |

FY08 Open/Closed Activity

New/Closed Door Activity — 48

FY08 Door Additions — 44

|  | High $474,369 | Medium $345,394 | Low $242,904 | Total Openings |
| --- | --- | --- | --- | --- |
| Q1 | 0 | 0 | 2 | 2 |
| Q2 | 0 | 0 | 0 | 0 |
| Q3 | 0 | 1 | 0 | 1 |
| Q4 | 0 | 0 | 0 | 0 |
| Total | 0 | 1 | 2 | 3 |

FY08 Door Reductions — 46

|  | High $474,369 | Medium $345,394 | Low $242,904 | Total Closings | Ending Doors — 52 |
| --- | --- | --- | --- | --- | --- |
| Q1 | 0 | 0 | 1 | 1 | 128 |
| Q2 | 0 | 0 | 0 | 0 | 128 |
| Q3 | 0 | 0 | 0 | 0 | 129 |
| Q4 |  |  |  |  | 129 |
| Total | 0 | 0 | 1 | 1 |  |

— 50

|  | AG Categories | FY09 Comp Actuals | FY 09 Comp. Trend | Next Year Input Trend |
|---|---|---|---|---|
| Everyday Cards | Everyday Cards | $ 50,673,997 | -3.1% | -4.0% |
| Everyday Non Card | Evdy Gift Wrap | $ 27,796,376 | -9.0% | -4.7% |
|  | Evdy Party Goods | $ 13,488,133 | -14.2% | -17.9% |
|  | Evdy Cello / Stationery | $ 2,070,576 | -17.8% | -3.3% |
|  | Evdy Stickers | $ 783,317 | -18.0% | -13.5% |
| Everyday Non-Card Total |  | $ 44,138,401 | -11.3% |  |
| Seasonal Card | Christmas | $ 7,741,498 | -9.7% | -1.0% |
|  | Valentines | $ 6,288,793 | -12.0% | -9.0% |
|  | Easter | $ 2,083,095 | 3.9% | 0.0% |
|  | Mother's Day | $ 5,928,874 | -10.3% | 0.0% |
|  | Father's Day | $ 4,179,551 | -10.0% | 0.0% |
|  | Graduation | $ 2,265,023 | 0.8% | 0.0% |
|  | Summer / Temps | $ - |  | 0.0% |
|  | Fall | $ 1,092,754 | -15.1% | 0.0% |
|  | Minor | $ 438,127 | -17.5% | 0.0% |
| Seasonal Card Total |  | $ 30,017,716 | -9.2% |  |

Report Out | Dashboard | Door Activity | Event Log | Trend | Plan Year Non-Card | Initiatives | Plan Year Summary | Plan by Week

Fig. 6

Rollup to Plan - Weekly Breakout

| Product Category | 2/6/2010 | 2/13/2010 | 2/20/2010 | 2/27/2010 | 3/6/2010 | 3/13/2010 | 3/20/2010 |
|---|---|---|---|---|---|---|---|
| Everyday Cards | $ 375,950 | $ 375,190 | $ 380,043 | $ 389,222 | $ 419,801 | $ 405,055 | $ 409,854 |
| Christmas | $ 31 | $ 16 | $ 7 | $ - | $ 12 | $ 7 | $ 9 |
| Valentines | $ 270,051 | $ 1,776,203 | $ 131,536 | $ 172 | $ 68 | $ 64 | $ 16 |
| Easter | $ - | $ - | $ 1,083 | $ 18,153 | $ 27,394 | $ 48,663 | $ 69,766 |
| Mother's Day | $ - | $ 24 | $ 7 | $ - | $ (2) | $ - | $ 55 |
| Father's Day | $ 7 | $ 0 | $ - | $ - | $ - | $ - | $ - |
| Graduation | $ - | $ 26 | $ - | $ 21 | $ 9 | $ 19 | $ 214 |
| Summer / Temps | $ - | $ - | $ - | $ - | $ - | $ - | $ - |
| Fall | $ 17 | $ - | $ 5 | $ - | $ 6 | $ - | $ - |
| Minor | $ 20 | $ 367 | $ 5,830 | $ 7,972 | $ 10,314 | $ 12,922 | $ 6,290 |
| Total Seasonal Cards | $ 270,126 | $ 1,776,644 | $ 138,468 | $ 26,318 | $ 37,801 | $ 61,675 | $ 76,349 |
| Evdy Gift Wrap | $ 111,973 | $ 306,681 | $ 111,578 | $ 112,281 | $ 119,249 | $ 140,477 | $ 191,889 |
| Evdy Party Goods | $ 74,184 | $ 67,434 | $ 51,868 | $ 46,273 | $ 49,897 | $ 53,198 | $ 49,013 |
| Evdy Cello / Stationery | $ 13,799 | $ 17,136 | $ 18,510 | $ 19,101 | $ 19,118 | $ 19,334 | $ 18,637 |
| Evdy Stickers | $ 3,708 | $ 10,015 | $ 3,589 | $ 5,432 | $ 7,216 | $ 7,509 | $ 13,969 |
| Everyday Non-Card | $ 203,664 | $ 451,266 | $ 183,545 | $ 183,087 | $ 195,280 | $ 220,518 | $ 273,498 |
| Seasonal Non-Card | $ 47,174 | $ 57,667 | $ 25,777 | $ 29,075 | $ 38,735 | $ 76,819 | $ 248,459 |
| Total Roll-up Sales | $ 896,914 | $ 2,670,768 | $ 727,834 | $ 627,703 | $ 691,617 | $ 765,068 | $ 1,008,160 |
| Gap/(Surplus) | $ - | $ - | $ - | $ - | $ - | $ - | $ - |
| Total Joint Plan | $ 896,914 | $ 2,670,768 | $ 727,834 | $ 627,703 | $ 691,617 | $ 765,068 | $ 1,008,160 |

110

| Report Out | Door Activity | Trend | Initiatives |
|---|---|---|---|
| Dashboard | Event Log | Plan Year Non-Card | Plan Year Summary |

| | FY09 Discounted Actuals | Door Activity | Significant Events | Seasonal Non-Card | FY10 AFB |
|---|---|---|---|---|---|
| Everyday Cards | $ 21,151,490 | $ 68,620 | $ - | $ - | $ 21,220,110 |
| Christmas | $ 1,736,530 | $ 0 | $ - | $ - | $ 1,736,530 |
| Valentines | $ 2,490,980 | $ - | $ - | $ - | $ 2,490,980 |
| Easter | $ 571,918 | $ (0) | $ - | $ - | $ 571,918 |
| Mother's Day | $ 2,413,908 | $ 16,614 | $ - | $ - | $ 2,430,522 |
| Father's Day | $ 1,596,723 | $ 10,511 | $ - | $ - | $ 1,607,234 |
| Graduation | $ 781,468 | $ 4,819 | $ - | $ - | $ 786,287 |
| Summer / Temps | $ - | $ - | $ - | $ - | $ - |
| Fall | $ 480,849 | $ 507 | $ - | $ - | $ 481,356 |
| Minor | $ 177,093 | $ 136 | $ - | $ - | $ 177,229 |
| Total Seasonal Cards | $ 10,249,469 | $ 32,587 | $ - | $ - | $ 10,282,057 |
| Evdy Gift Wrap | $ 7,753,831 | $ 27,080 | $ - | $ - | $ 7,780,911 |
| Evdy Party Goods | $ 2,729,736 | $ 10,782 | $ - | $ - | $ 2,740,518 |
| Evdy Cello / Stationery | $ 1,083,232 | $ 3,589 | $ - | $ - | $ 1,086,822 |
| Evdy Stickers | $ 308,095 | $ 940 | $ - | $ - | $ 309,034 |
| Everyday Non-Card | $ 11,884,894 | $ 42,392 | $ - | $ - | $ 11,927,285 |
| Seasonal Non-Card | $ 3,523,088 | $ - | $ - | $ (3,523,088) | $ - |
| Total Sales | $ 46,808,941 | $ 143,599 | $ - | $ (3,523,088) | $ 43,429,452 |

| | FY10 AFB | Comp. Trend Impact | Door Activity | Seasonal Non-Card | FY10 Initiatives | FY10 Discounted Estimate | YOY % Change |
|---|---|---|---|---|---|---|---|
| Everyday Cards | $ 21,220,110 | $ 192,088 | $ - | $ - | $ 236,613 | $ 21,648,811 | 2.4% |
| Christmas | $ 1,736,530 | $ 26,048 | $ - | $ - | $ - | $ 1,762,578 | 1.5% |
| Valentines | $ 2,490,980 | $ 24,910 | $ - | $ - | $ - | $ 2,515,890 | 1.0% |
| Easter | $ 571,918 | $ (8,579) | $ - | $ - | $ - | $ 563,339 | -1.5% |
| Mother's Day | $ 2,430,522 | $ 60,763 | $ - | $ - | $ - | $ 2,491,285 | 3.2% |
| Father's Day | $ 1,607,234 | $ 40,181 | $ - | $ - | $ - | $ 1,647,415 | 3.2% |
| Graduation | $ 786,267 | $ 15,726 | $ - | $ - | $ - | $ 802,013 | 2.6% |
| Summer / Temps | $ - | $ - | $ - | $ - | $ - | $ - | |
| Fall | $ 481,356 | $ 7,220 | $ - | $ - | $ - | $ 488,577 | 1.5% |
| Minor | $ 177,229 | $ - | $ - | $ - | $ - | $ 177,229 | 0.1% |
| Total Seasonal Cards | $ 10,282,057 | $ 166,269 | $ - | $ - | $ - | $ 10,448,326 | 1.6% |
| Evdy Gift Wrap | $ 7,780,911 | $ (369,546) | $ - | $ - | $ 350,410 | $ 7,751,776 | -0.2% |
| Evdy Party Goods | $ 2,740,518 | $ - | $ - | $ - | $ 14,780 | $ 2,755,298 | 0.9% |
| Evdy Cello / Stationery | $ 1,086,822 | $ (43,473) | $ - | $ - | $ 170,917 | $ 1,214,266 | 12.1% |
| Evdy Stickers | $ 309,034 | $ (3,090) | $ - | $ - | $ 69,000 | $ 374,944 | 21.7% |
| Everyday Non-Card | $ 11,927,285 | $ (436,109) | $ - | $ - | $ 605,107 | $ 12,096,283 | 1.8% |
| Seasonal Non-Card | $ - | $ - | $ - | $ 3,551,700 | $ - | $ 3,551,700 | |
| Total Sales | $ 43,429,452 | $ (77,752) | $ - | $ 3,551,700 | $ 841,720 | $ 47,745,120 | 2.0% |

Report Out:
- Dashboard
- Door Activity
- Event Log
- Trend
- Plan Year Non-Card
- Initiatives
- Plan Year Summary
- Plan by Week

RETAIL PLANNING APPLICATION AND METHOD FOR CONSUMER PRODUCTS

RELATED APPLICATIONS

This application is a divisional of U.S. patent application Ser. No. 13/153,963, filed on Jun. 6, 2011, now U.S. Pat. No. 8,589,270 which claims priority to U.S. Provisional Patent Application No. 61/351,443, filed on Jun. 4, 2010, and also U.S. Provisional Patent Application No. 61/363,311, filed on Jul. 12, 2010. Each of the above-referenced patent applications is incorporated by references herein in its entirety.

FIELD OF THE INVENTION

The present invention is directed to retail planning and forecasting and more particularly to a retail planning application for consumer products including but not limited to social expression products.

BACKGROUND OF THE INVENTION

Accurately forecasting demand for products is of great importance in the retail industry as it drives inventory control, purchase planning, work force planning as well as other mission critical activities. Inaccurate retail planning can have an extremely adverse impact on the profits of a retail organization. The relationship between a vendor (supplier of consumer products) and retailer (the seller of such consumer products to the retail customer) is critical. The vendor must understand the retailer's sales goals, among other things, and have an understanding of exactly how the vendor might impact those sales goals. Most retailers have multiple vendors within a specific category of the retail store (such as the social expression or greeting card department). The retailer has overall sales expectations of the vendor, but often times, those overall sales expectations are not so clear. A tool is needed to help translate the retailer's sales goals to the specific vendor. A tool is also needed to help translate the retailer's sales goals to the specific vendor. A tool is also needed to show the impact of certain decisions (new products, promotions, etc.) will have on the overall sales goals for the vendor and the retailer. It is also helpful to have updates in real-time in order to verify the assumptions along the way and make adjustments as necessary. While some very complicated tools may exist, there is a need in the market for a simple tool that quickly and easily communicates the foregoing, to allow the vendor and retailer to make decisions with respect to product purchases, product mixes and various other factors that impact the relationship between the vendor and the retail customer.

SUMMARY OF THE INVENTION

The present disclosure and related invention is directed to an improved retail planning and forecasting tool or forecasting and modeling tool used to plan and estimate sales of consumer products, including social expression products. As used herein, the term "social expression products" refers to and includes, but is not limited to, products such as greeting cards, gift wrap, gift wrap accessories, party supplies, stationery, coffee mugs, stuffed animals or any category of product that would typically be sold by a greeting card vendor. The term "vendor", as used herein, refers to the supplier of retail products. The term "retailer" refers to the seller of retail products to the end consumer. Retailers typically have specific overall sales goals and objectives and it is critical to the retailer that a realistic sales plan is in place to assure they reach their goals. A retail sales plan must be adjusted quickly and appropriately in real-time throughout the course of the year to assure that both the vendor and the retailer meet their respective sales targets, or at least manage expectations if they will not. In other words, if it becomes clear that sales goals will not be met, expected profits must be adjusted for each party and in some cases, overhead must be adjusted. For all these reasons, a joint planning tool is critical to both the vendor and the retailer. The planning tool of the present invention enables retailers to create a plan based on information shared between the retailer and vendor of social expression products. The methodology employed begins with actual sales totals for the prior term and the plan goal for the current term and provides financial calculations based on a variety of factors to determine the sales bridge needed to meet the current term goal. Information relating to actual sales, significant events, door activity, current forecast, trending data, and vendor initiatives are input into the application and are used in financial calculations to determine a current term sales plan.

A traditional retailer typically has multiple vendors for a particular product category or department. The retailer has overall sales goals and objectives for the retail store as a whole, but also for the specific category or department. It is important that the vendor and retailer work together to establish expectations and determine how each may help the other achieve their goals. It is important that the factors be specific and not overly generalized (e.g., "increase sales of your product"). It is also important that the forecasting tools be realistic and accurate, and that the goals can be measured in real-time over the year, to allow for adjustments.

The joint planning tool and methodology of the present invention achieves these objectives by: (1) providing for an improved relationship between the vendor and the retailer because each party better understands the impact they have on each other with respect to sales objectives; (2) the vendor better understands the overall sales goals of the retailer (at least for that overall category or department, such as the greeting card department); (3) provides for fact-based decision making through proven assumptions. The tool has a "dashboard" with bar graphs that clearly show gaps in the goal and the forecast and provides the ability to make adjustments so that the "planners" can immediately see the impact. Over the course of the year, the joint planning tool must take into consideration a methodology to measure the forecast against actual sales at the retailer so that further adjustments can be made throughout the year in order to adjust goals or achieve the original sales objectives (by new initiatives, promotions and such). The software and methodology of the present invention is designed and built to achieve these goals.

DESCRIPTION OF THE FIGURES

FIGS. 1A-1C are various charts which make up the dashboard of the retail planning application of the present invention.

FIG. 4 is a door activity template of the retail planning application of the present invention.

FIG. 6 is a class level trending template of the retail planning application of the present invention.

FIG. 8 is a weekly planning template of the retail planning application of the present invention.

FIG. 9 is a detailed sales bridge template of the retail planning application of the present invention.

DETAILED DESCRIPTION OF PREFERRED AND ALTERNATE EMBODIMENTS

Figure 1A:
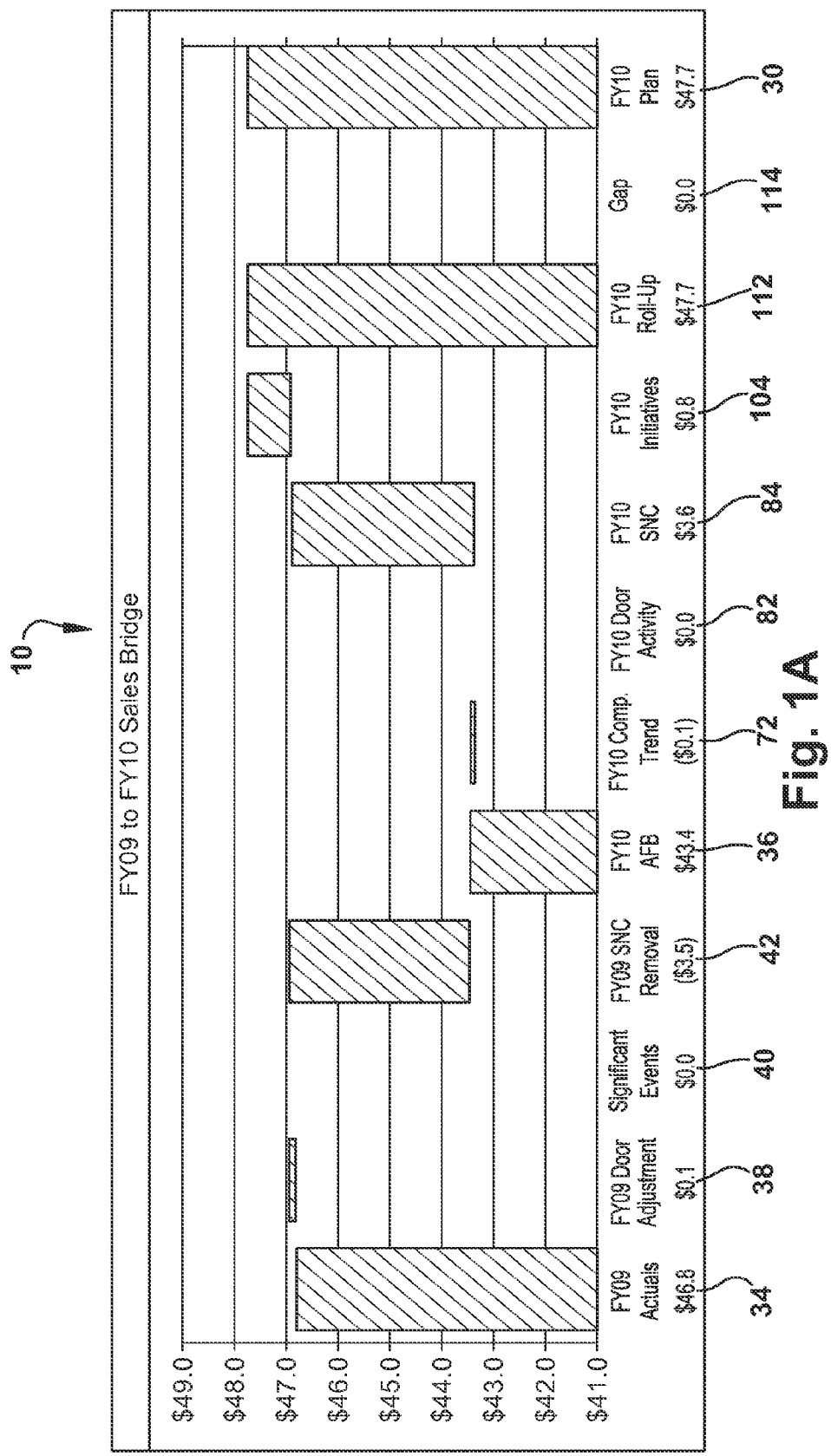

The retail planning application for social expression and other products of the present disclosure and related inventions is an improved forecasting and modeling tool used to plan and estimate sales of products, and more particularly, social expression products. The tool enables retailers to create a sales plan based on information shared between the retailer and vendor, to identify a gap between a retail sales goal and forecasting data on sales, to provide options to show the impact of decisions, and to periodically evaluate the plan and make adjustments, if necessary. As referred to herein, the term "sales plan" refers to the activities, planning, implementation, goals and objectives of a company's sales and profit activities. The term "plan" and "sales plan" may be used interchangeably throughout this disclosure. The application and methodology may be implemented in various embodiments. For example, as described herein, the application may be part of a spreadsheet-like application having various interrelated spreadsheets and a user interface for entering and displaying data, both numerically and visually in the form of graphs and charts. The various spreadsheets of the application may also contain embedded instructions for performing various calculations and updates based on the entered data. A user may manually enter data into the various spreadsheet cells within the application or data may be uploaded from a data file into the application (both methods of entering data may be referred to interchangeably as user-entered data). Although the retail planning application is described herein as being implemented as a spreadsheet application, this is not meant in any way to limit the methods by which the invention may be implemented. Other implementation methods include, but are not limited to, one or more computer programs residing on a client computer or one or more programs which are developed for a client server model or by cloud computing, or in a web-based application.

The methodology employed by the application uses actual sales totals for a prior sales term (preferably the most recent prior sales term) which are adjusted by various factors related to seasonal sales and sales events or initiatives which are not likely to occur in the current sales term, to determine an adjusted baseline for current term sales. The adjusted baseline is further adjusted to include estimated seasonal sales for the current term, significant sales events, door activity (i.e., number of stores or retail locations newly opened or closed), current forecast, trending data, and vendor initiatives. Once the estimated sales for the current sales term are determined, they can be compared to the current term sales goal. Depending on whether the current sales estimate is above or below the current sales goal, adjustments may be made to the current term sales initiatives or events. The application provides a quick and easy way to see the impact of various changes to the sales plan on the estimated sales. The application also converts the input data into various visual representations summarizing various aspects of the data and displays this data on what is referred to as a dashboard, shown in FIGS. 1A-1C. The dashboard provides a simple illustration (both numerical and visual) of the sales goal and potential gap between the sales goal and the predicted sales total, despite the fact that the underlying method of deriving these figures is quite intensive and complicated. The terms "tab", "sheet", "spreadsheet", "page" and "template" are used interchangeably throughout this specification. Once the sales plan has been determined, the application can be used throughout the sales term to provide up-to-date weekly updates, gauge progress with respect to the sales plan and proactively adjust the sales plan as necessary to meet the targeted sales goal.

Figure 1C:
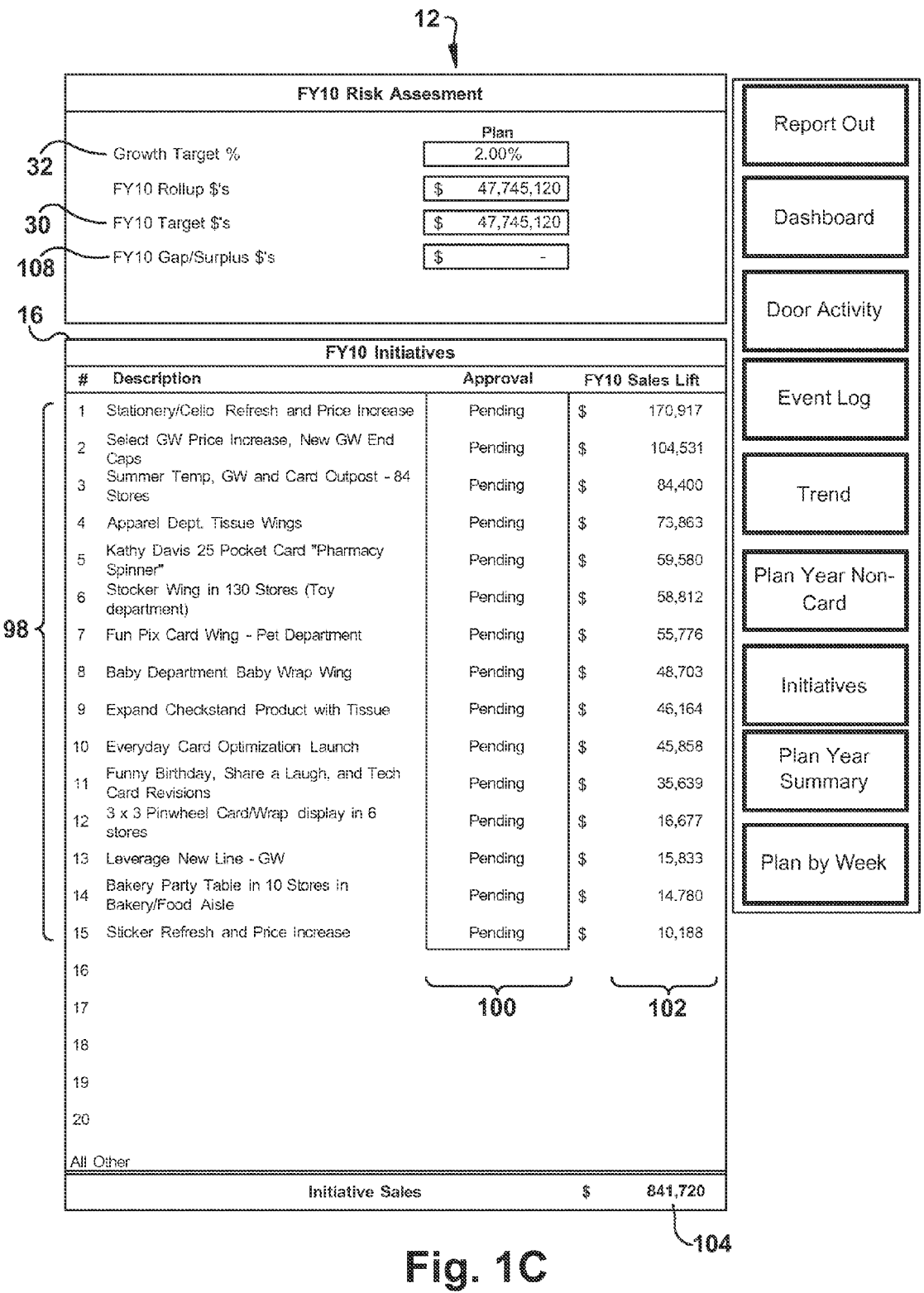

In one embodiment, the planning application of the present disclosure and related inventions is in the form of a spreadsheet-based computer program, such as an Excel spreadsheet application, however, the application may utilize alternative spreadsheet packages, databases or other programs or products that allow for data storage and manipulation. A main screen, referred to as a "dashboard" provides the user with an overall view of the sales plan. Using embedded instructions, the information entered into several interrelated spreadsheets or tables is rolled up into the summarized information displayed on the dashboard. Changes made on individual spreadsheets or tables will effect changes on the dashboard. The dashboard provides a concise visual overview of the sales plan over the life of the plan which may include, but is not limited to: the sales bridge between the prior term actual sales total to the current year plan (FIG. 1A); the plan goal or growth target; the gap between the current plan and the goal (FIG. 1A); the planned initiatives and current status of said initiatives (FIG. 1C); and year to year sales comparisons (FIG. 1B). In a representative embodiment, the information is displayed in four distinct sections on the dashboard. Despite the complexity of the data and forecasting methods, the dashboard visualizes this information in simple, easy to understand charts or graphs. A first section 10, shown in FIG. 1A contains a waterfall chart which visualizes the sales bridge between prior and current sales terms. The numerical data behind the waterfall chart can be viewed and verified or confirmed on the detailed sales bridge template or table 116, as shown in FIG. 9. A second section 12 of the dashboard, shown in FIG. 1C, shows the current term risk assessment. A third section 14, shown in FIG. 1B, contains a product summary of the current term plan which includes total expected sales per social expression category and a fourth section 16, shown in FIG. 1C, details the current term initiatives, the status of such initiatives and the potential sales lift associated with each initiative. The dashboard is the main focus of the planning application as it provides a high-level, visual overview of the plan in addition to the information that affects the plan in both beneficial and detrimental ways. It also enables a user to visualize how changes to various aspects of the plan affect the overall plan or to perform a sensitivity analysis and what-if scenarios.

Figure 2:
FIG. 2 is a reporting template of the retail planning application of the present invention.

The planning methodology begins with actual data from the prior sales term. A sales term may be any amount of time in which a retailer wishes to evaluate and analyze sales data. For the purpose of illustration, a sales term is considered herein to be one year, however, the description and examples set forth herein are in no way intended to restrict the sales term to a one year period. The sales data for the prior sales term includes total sales dollars by social expression category. While the sales data is described herein as being broken down by category, an alternate embodiment of the present invention may further break down the sales information to product or SKU-level data. The top level product categories, shown in FIG. 2, include everyday cards 18, seasonal cards 20, everyday non-card merchandise 22 and seasonal non-card merchandise 24. The seasonal card and non-card categories may further be broken down into season or holiday sub-categories 26 such as, for example, Christmas, Valentine's Day, Easter, Mother's Day, Father's Day, Graduation, etc. The everyday non-card category may further be broken down into subcategories 28 such as for example, everyday gift wrap, everyday party goods, everyday stationery, everyday stickers, etc. A second required input to the planning application is the current term sales goal 30. Again, as mentioned above the current term is, for the sake of illustration and example, considered to be one year. The current term sales goal 30 is determined by the retailer and may be a particular growth target 32 percentage increase over the actual previous term sales, such as for example, 3%, 5%, 10%, etc. Once application has the starting point, which is the actual sales numbers for the previous term 34, and the end point, which is the total current term sales goal 30, additional information may be added to determine an adjusted financial baseline (AFB) 36 from which predictive information may be added in order to create a forecast or plan for meeting the current term sales goal.

Establishing an AFB 36 requires recent sales term information regarding door activity 38, significant events 40 and the removal of seasonal non-card sales 42 for the previous term, which will each be discussed in detail below. These factors adjust the actual sales numbers from the previous term based on events that had a financial impact on the previous term or planning period that may not have a future effect on current term sales. This information provides realistic data from which assumptions can be based.

One aspect of determining a current AFB 36 is determining the financial impact of prior term door activity. Door activity refers to retail store openings or closings. The door activity is contained in a separate spreadsheet that feeds the dashboard and contains input cells used to identify the net sales impact associated with door activity, as shown in FIG. 4. The input data includes sales estimates grouped by high, medium and low impact additions 44 and reductions 46; the total number of openings 48; the total number of closings 50; the total number of doors after expected openings/closings 52; the financial impact on opened/closed doors 54; the financial impact on relocation/remodel 56; total financial impact 58; and the total door count summary by sales term 60. This information is rolled up to a single figure representing the total financial impact related to prior term door activity 38. The total impact may be positive if additional stores were opened during the previous term and may be negative if stores were closed during the term. The total door activity impact 38 is either added to or subtracted from the prior term sales FIG. 34 (along with additional input figures described below) as a first step in determining a current AFB 36.

Figure 3:
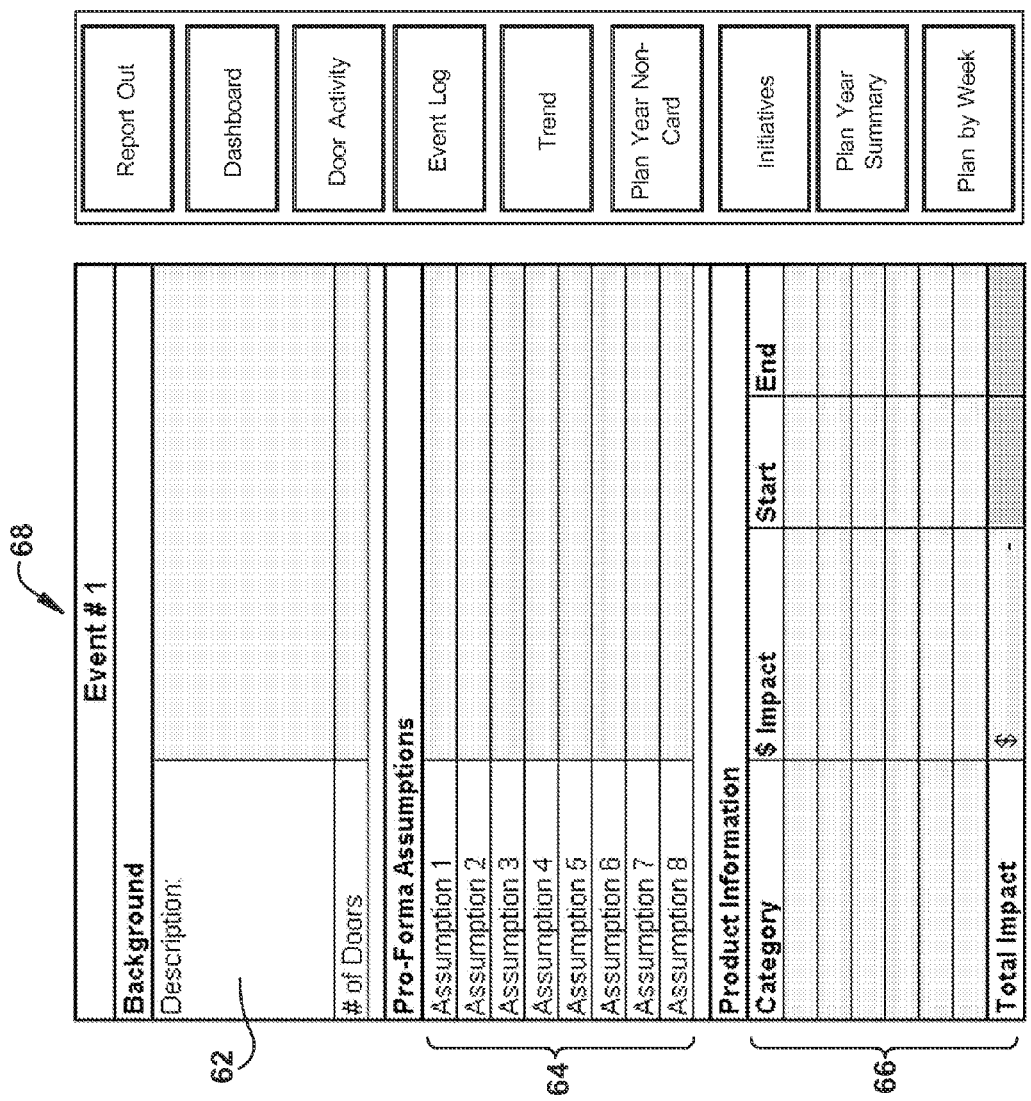
FIG. 3 is a significant events template of the retail planning application of the present invention.

The next step in determining the AFB 36 is to consider significant events that happened during the prior sales term. A significant event is any event that has the ability to have a material impact on sales. Examples of significant events include, but are not limited to: a reduction or increase in retail sale space, a change in licensed merchandise mix, or a competing vendor acquiring some of the current retail space. These events may have a positive or negative impact on sales. The significant events tab or table, shown in FIG. 3, feeds information to the dashboard. The tab or table contains space for a description of each event 62, the assumptions made by the planning application user to quantify the significant event 64, and product information 66. The product information may be broken down by category and includes start and end dates. This communicates the sales impact to each category and the associated timing of each event. This information can be reviewed between the vendor and the retailer to confirm that the assumptions, events and monetary impact predictions are valid. The total impact of significant events for the prior sales term 40 is depicted on the waterfall bar chart 10 located on the dashboard. If the total impact figure seems suspect, the vendor and/or retailer can move to the significant events tab 68 and review the data and corresponding assumptions 64. This creates a more collaborative relationship between the vendor and retailer and adds transparency throughout the forecasting process. Shortcomings or shortfalls can be discussed and expectations can be adjusted, if necessary. Changes made to cells in the significant events tab or table 68 are reflected on the dashboard and in the overall sales plan.

Figure 5:
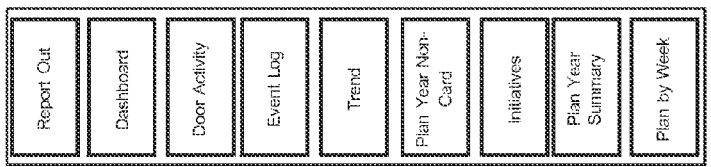
FIG. 5 is a seasonal non-card plan year forecast template of the retail planning application of the present invention.

The final step in establishing an AFB 36 is to factor out the prior sales term Seasonal Non-Card (SNC) merchandise. A representative SNC template 70 is shown in FIG. 5. SNC merchandise is any seasonal merchandise sold by the vendor to the retailer that is considered greeting cards, gift wrap, party goods, stickers, ornaments, stationery, stuffed animals, etc. This merchandise is sold from the vendor to the retailer on a yearly basis and may vary from year to year and between seasons.

Once the previous term actual sales number 34 has been adjusted by previous term door adjustments 38, significant events 40 and SNC merchandise 42, the remaining number is considered the current term AFB 36. The AFB 36 is further adjusted by current term predictive data, to be discussed in detail below, to ultimately reach a current term sales plan.

One category of predictive data that is factored into the AFB 36 with the purpose of establishing the current term sales plan is class or category level trending 72. Each everyday and seasonal product categories are trended. The prior term actual sales data by category 74 is used as a starting point and then prior term trends 76 and current term trending percentages 78 are applied. The class or category level trending tab or spreadsheet 80 is used as an input to the dashboard and is shown in FIG. 6. Trending data may be updated frequently, such as monthly, to keep trend data up to date and to improved accuracy of the sales plan. Updating this information on a regular basis allows the retailer and vendor to proactively adjust sales strategy and initiatives to facilitate meeting current sales goals.

Another adjustment category involves door activity. As mentioned above, the previous term door activity 38 was removed from the previous term sales total 34 in order to arrive at the AFB 36. Now, predictive door activity 82 is factored into the AFB 36 in order to more accurately predict current term sales. As discussed above, door activity refers to the opening or closing of retail stores. Obviously, the closing of stores will have a negative impact on total sales and the opening of sores will have a positive impact on sales. High, medium and low estimates of the financial impact of door additions and reductions are entered into the door activity spreadsheet or table. The number of anticipated openings and closings for the current term are entered into the spreadsheet or table and the financial estimates are used to determine a total financial impact due to anticipated door activity in the current term 82. This number is added or subtracted from the AFB 36.

Seasonal non-card (SNC) merchandise for the current term 84 is estimated and added to the AFB 36. As mentioned above, SNC merchandise refers to merchandise such as gift wrap, ornaments and stuffed animals. This merchandise is purchased every year by the retailer and the total amount purchased may vary from year to year. If the total SNC for the current term 84 is known it can be input directly into the spreadsheet or table 70, otherwise an estimated SNC total may be used.

Figure 7:
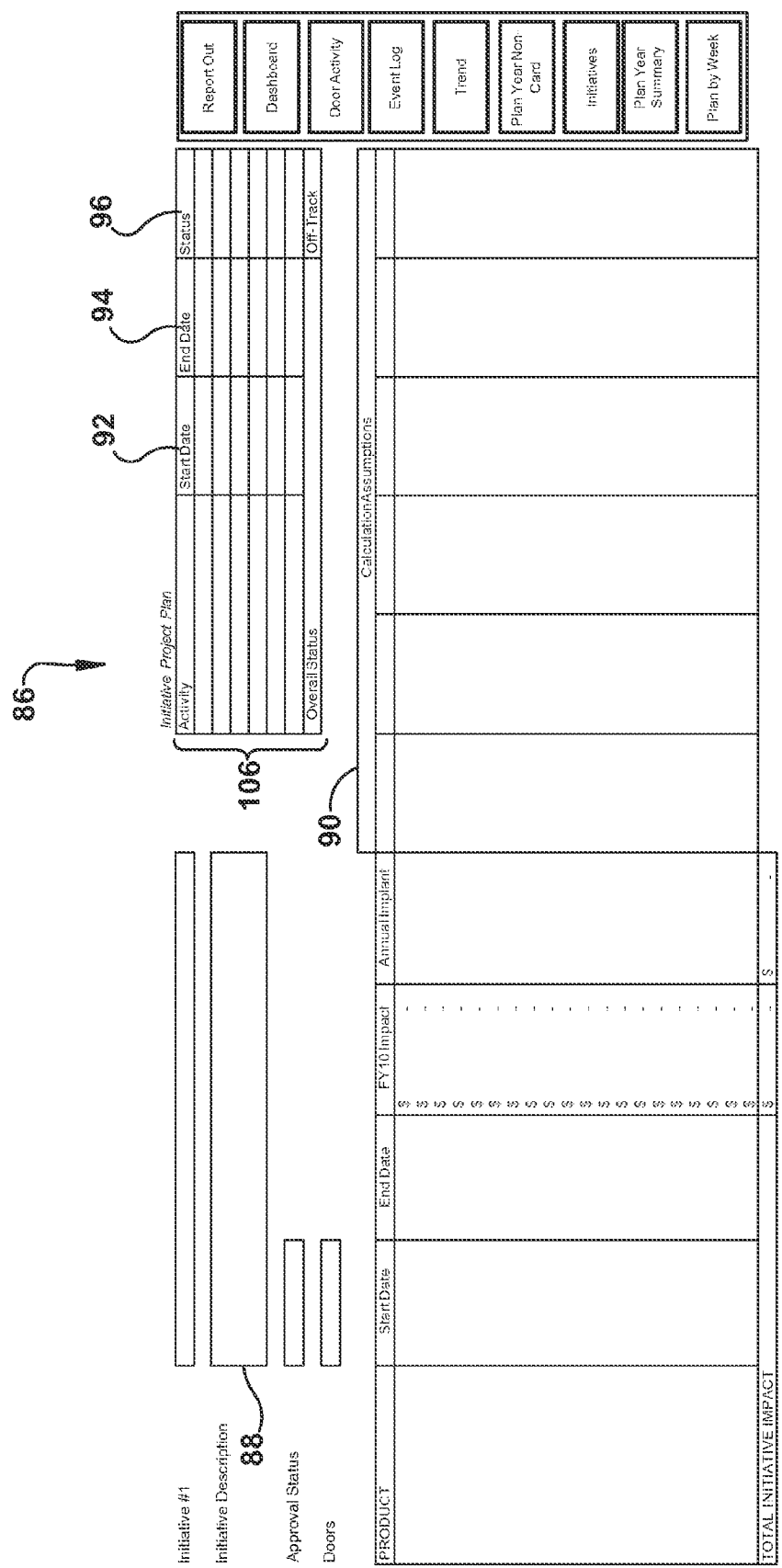
FIG. 7 is an initiatives development template of the retail planning application of the present invention.

The final piece of predictive data used to establish the current term sales plan are plan initiatives. Sales plan initiatives are used to quantify the sales value and status of joint plan initiatives. Initiatives are any new and/or incremental product or program the vendor offers to the retailer. For example, an initiative may be a new line of greeting cards or new product, sales promotions, expanded licensed goods, merchandise price changes, new merchandise fixtures, etc. Initiatives are proposed by the social expression vendor and may be subject to approval by the retailer. The planning application aids in showing the retailer the potential sales lift provided by approving particular initiatives. The initiatives tab or table 86, shown in FIG. 7, provides space for the basic description 88 and associated objectives of each initiative and a listing of the vendor categories that will be impacted by the initiative. A list of assumptions 90 used to calculate the sales benefit of the initiative is provided to make transparent all input between the vendor and retailer. Also included are a project plan of major milestones, start 92 and end dates 94 and the status 96 of each activity. The information provided on the initiatives tab or table 86 feeds a current term initiatives chart 16 located on the dashboard. The chart 16 shows each proposed initiative 98 and whether the initiative has gained approval 100 from the retailer or whether it is still pending. It also shows the potential sales lift 102 provided by implementing each initiative and the corresponding status of each initiative. The potential sales lift figures 102 for approved initiatives are considered in the roll up total of initiatives 104 used to develop the current term sales plan. Initiatives that are pending are not included in the total potential sales lift 104. This information allows the retailer to perform what-if analysis on each initiative by revealing the potential financial impact on the current term sales plan. Another aspect of the initiatives table 16 located on the dashboard that shows the impact of each initiative is the status column. As previously mentioned, the initiatives tab 86 contains a project plan 106 that sets a status 96 for each activity that makes up each initiative and the proposed start 92 and end dates 94. If one of the milestone activities along the critical path of the initiative is not completed before the proposed end date, then the initiative is given a status of off-track. Any initiative that is considered off-track poses a potential risk to the retailer because the sales lift created by the completed initiative may not be realized or may be realized at a later date. This would affect the retailer's ability to reach the current term plan because the initiatives were used in the current term roll-up number 112 that determines how much of a gap 114 remains between the forecasted roll-up number 112 and the current term plan 30. The gap 114 can also be referred to as the amount of risk that the vendor and retailer are assuming based on the current plan numbers. A risk assessment chart 12 is included on the dashboard which allows the vendor and/or retailer to perform plan sensitivity analysis by varying the target growth percentage rate 32 and viewing the gap or risk 108 associated with each target rate. A retailer/vendor wishing to minimize risk may choose to adjust the growth rate or may alternatively choose to add initiatives or to adjust or vary other inputs to the plan.

The planning application can also produce a summary report which allows for a direct comparison between year to date (YTD) actual sales and the current term sales plan and also between YTD actual sales and the prior term sales total. This information can be captured at anytime during the sales term to gauge current performance with respect to the plan. The application can also produce a weekly breakout report 110, shown in FIG. 8, which details category level sales by week. The yearly estimated sales total is allocated across each week with seasonal and holidays factored into the weekly breakdown.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Other features and aspects of this invention will be appreciated by those skilled in the art upon reading and comprehending this disclosure. Such features, aspects, and expected variations and modifications of the reported results and examples are clearly within the scope of the invention where the invention is limited solely by the scope of the following claims.

What is claimed is:

1. A retail planning and forecasting tool comprising:
   a computer with a processor having circuitry to execute instructions;
   a computer-readable storage medium having executable computer code stored thereon, the computer code operative to use the processor to determine a current term sales bridge by executing the following steps:
   accept and store data representing a value equal to a total previous term sales dollars;
   accept and store financial data affecting the total previous term sales dollars; and
   calculate a current term adjusted financial baseline by subtracting the financial data affecting the total previous term sales dollars from the total previous term sales dollars;
   accept and store financial data affecting the current term adjusted financial baseline;
   calculate a value equal to a total current term estimated sales by adding the financial data affecting the current term baseline to the current term adjusted financial baseline;
   accept and store a value equal to a current term sales goal; and
   calculate the current term sales bridge by subtracting the current term estimated sales from the current term sales goal.

2. The retail planning and forecasting tool of claim 1, further comprising a graphical user interface which is operative to accept user-entered information.

3. The retail planning and forecasting tool of claim 2, wherein the user-entered information is data which is manually entered into the computer via a keyboard and/or data contained in one or more data files which is uploaded to the computer.

4. The retail planning and forecasting tool of claim 2, wherein the graphical user interface is operative to visually display user-entered and program-generated data.

5. The retail planning and forecasting tool of claim 4, wherein the visual display of user-entered and program-generated data includes charts and graphs.

6. The retail planning and forecasting tool of claim 3, wherein program-generated data is re-calculated each time the user-entered data is changed.

7. The retail planning and forecasting tool of claim 1, wherein the financial data affecting the total previous term sales dollars and the current term adjusted financial baseline are door activity, significant events and sales of seasonal non-card merchandise.

* * * * *